United States Patent [19]

Yamauchi et al.

[11] Patent Number: 5,621,576
[45] Date of Patent: Apr. 15, 1997

[54] OPTICAL HEAD FOR OPTICAL MEMORY DISK RECORDING DEVICE WITH ELASTIC SUPPORT IN A DIRECTION PARALLEL TO A RECORDING SURFACE

[75] Inventors: Yoshiaki Yamauchi; Shozo Saegusa, both of Ibaraki-ken; Atsushi Ichikawa, Tsukuba; Akio Yabe, Fujisawa; Akira Saito, Odawara; Hiromitu Mori, Ibaraki-ken, all of Japan

[73] Assignees: Hitachi, Ltd., Tokyo; Hitachi Video & Information Systems, Inc., Kanagawa-ken, both of Japan

[21] Appl. No.: 249,231

[22] Filed: May 25, 1994

[30] Foreign Application Priority Data

Jun. 29, 1993 [JP] Japan ............................ 5-158545

[51] Int. Cl.⁶ ............................ G02B 7/02; G11B 7/095
[52] U.S. Cl. .................... 359/814; 369/44.15; 369/44.17
[58] Field of Search .......................... 369/44.14–44.16, 369/44.17–44.21, 215, 219; 359/813–814, 823–824

[56] References Cited

U.S. PATENT DOCUMENTS 5,164,936  11/1992  Kagami .................... 369/44.15 X

FOREIGN PATENT DOCUMENTS

4-32035  2/1992  Japan .
4-24769  4/1992  Japan .

Primary Examiner—W. R. Young
Attorney, Agent, or Firm—Antonelli, Terry, Stout & Kraus, LLP

[57] ABSTRACT

An optical head for a recording device in which data are recorded on a recording surface of an optical memory disk, comprises, a head body which is substantially prevented from moving perpendicularly to the recording surface and is movable to be positioned roughly along the recording surface, an object lens for focussing a light beam on the recording surface, a carriage on which the object lens is mounted and which is movable to be positioned precisely along the recording surface, a drive base member for generating a force substantially parallel to the recording surface between the drive base member and the carriage to position precisely the carriage along the recording surface, and an elastic member for connecting the drive base member to the head body to support the drive base member relative to the head body elastically in a direction substantially parallel to the recording surface, joining areas between the elastic member and the drive base member and between the elastic member and the head body are aligned substantially straightly.

15 Claims, 7 Drawing Sheets

OPTICAL HEAD FOR OPTICAL MEMORY DISK RECORDING DEVICE WITH ELASTIC SUPPORT IN A DIRECTION PARALLEL TO A RECORDING SURFACE

BACKGROUND OF THE INVENTION AND RELATED ART STATEMENT

The present invention relates to an optical head for a recording device by which data are recorded onto and/or read out from an optical memory disk, for example, a video disk, a compact disk, a photo-electromagnetic type disk or the like, with a light beam, particularly relates to a structure for preventing the optical head from being vibrated.

In a prior-art optical head disclosed by Publication of Japanese Unexamined Patent Application Hei-4-32035, a carriage with an object lens is driven and positioned in a direction substantially perpendicular to a recording surface of the optical memory disk, a force for driving the carriage is generated in the direction between the carriage and a yoke-like member, and the yoke-like member is elastically supported by an elastic member against the force in the direction substantially perpendicular to the recording surface.

OBJECT AND SUMMARY OF THE INVENTION

An object of the present invention is to provide an optical head in which a vibration of an object lens is prevented, and/or the object lens is smoothly and precisely positioned.

According to the present invention, an optical head for a recording device in which data are recorded on a recording surface of an optical memory disk, comprises,

- a head body which is substantially prevented from moving perpendicularly to the recording surface and is movable to be positioned roughly along the recording surface,
- an object lens for focussing a light beam on the recording surface,
- a carriage on which the object lens is mounted and which is movable to be positioned precisely along the recording surface,
- a drive base member for generating a force substantially parallel to the recording surface between the drive base member and the carriage to position precisely the carriage along the recording surface, and
- elastic means for connecting the drive base member to the head body to support the drive base member relative to the head body elastically in a direction substantially parallel to the recording surface.

Since the elastic means connects the drive base member to the head body to support the drive base member relative to the head body elastically in the direction substantially parallel to the recording surface, a vibration of the drive base member caused by the force for positioning precisely the carriage along the recording surface is prevented from being transmitted to the head body or absorbed, and a vibration of the head body is prevented from being transmitted to the carriage or absorbed, so that a vibration of the carriage is prevented.

The elastic direction substantially parallel to the recording surface in which direction the drive base member is supported elastically relative to the head body may be oblique or parallel to a direction in which the force is generated. The drive base member may be elastically deformed by the force in the direction to transmit a vibration of the drive base member to the elastic means. The elastic means which may be in the form of a plate-like member may be elastically twisted or bent by the force to support elastically the drive base member relative to the head body in the direction. The elastic means may be elastically deformed in accordance with an elastic deformation of the drive base member caused by the force so that the drive base member is supported elastically relative to the head body.

The head body may further comprise a rotationally supporting means for supporting the carriage in a rotatable manner on the head body so that the carriage is rotated on the head body by the force to be moved along the recording surface. In a direction substantially perpendicular to the recording surface, a level in which at least a part of the elastic means extends may be different from a level in which the force is generated, so that a moment of a force around an imaginary axis substantially parallel to the recording surface for bending and/or twisting elastically the at least a part of the elastic means is applied by the force to the elastic means to support elastically the drive base member in the direction. The elastic means may extend substantially parallel to the force to reduce a bending rigidity thereof or extend substantially perpendicularly to the force to reduce a twisting rigidity thereof.

The optical head may further comprises a supplemental supporting means for connecting the drive base member to the head body to support the drive base member relative to the head body elastically in a direction oblique to the recording surface. The optical head may further comprises a viscoelastic member for connecting the drive base member to the head body, a viscoelastic member for connecting the drive base member to the elastic means, a viscoelastic member attached to the elastic means, and/or a viscoelastic member for connecting the head body to the elastic means.

The drive base member may include at least two projections, a dent for receiving the carriage between the projections, and a connector member connecting the projections to each other. A cross-sectional area of the elastic means may vary along a longitudinal direction of the elastic means.

According to the present invention, an optical head for a recording device in which data are recorded on a recording surface of an optical memory disk, comprises,

- a head body which is substantially prevented from moving perpendicularly to the recording surface,
- an object lens for focussing a light beam on the recording surface,
- a carriage on which the object lens is mounted and which is movable perpendicularly to the recording surface,
- a drive base member for generating a force between the drive base member and the carriage to position the carriage relatively to the recording surface, and
- elastic means for connecting the drive base member to the head body to support elastically the drive base member relative to the head body,
- wherein the optical head further comprises two joining areas between the elastic means and the head body and/or between the elastic means and the drive base member, the head body includes a shaft extending substantially perpendicularly to the recording surface, the carriage includes a hole in which the shaft is fitted, and an axis of the shaft and hole extends along an imaginary plane which includes an imaginary line extending between the joining areas and which extends substantially perpendicularly to the recording surface, so that a frictional force between the shaft and the hole occurs substantially on the imaginary plane to prevent a movement smoothness of the drive base member from being deteriorated with an excessive or unnecessary twisting or bending deformation of the elastic means by the frictional force.

According to the present invention, an optical head for a recording device in which data are recorded on a recording surface of an optical memory disk, comprises, a head body which is substantially prevented from moving perpendicularly to the recording surface, an object lens for focussing a light beam on the recording surface, a carriage on which the object lens is mounted and which is movable perpendicularly to the recording surface, a drive base member for generating a force between the drive base member and the carriage to position the carriage relatively to the recording surface, and elastic means for connecting the drive base member to the head body to support elastically the drive base member relative to the head body, wherein the optical head further comprises at least two first joining areas between the elastic means and the drive base member, the optical head further comprises a second joining area between the elastic means and the head body, the first joining areas are arranged away from the second joining area in a direction substantially parallel to the recording surface, and the second joining area is arranged between the first joining areas, so that a displacement of each of the first joining areas in a direction substantially parallel to the recording surface by an elastic deformation of the elastic means is kept small. The first joining areas and the second joining area may be aligned substantially straightly in the direction substantially parallel to the recording surface.

According to the present invention, an optical head for a recording device in which data are recorded on a recording surface of an optical memory disk, comprises, a head body which is substantially prevented from moving perpendicularly to the recording surface, an object lens for focussing a light beam on the recording surface, a carriage on which the object lens is mounted and which is movable perpendicularly to the recording surface, a drive base member for generating a force between the drive base member and the carriage to position the carriage relatively to the recording surface, and elastic means for connecting the drive base member to the head body to support elastically the drive base member relative to the head body, wherein the optical head further comprises a first joining area between the elastic means and the drive base member, the optical head further comprises at least two second joining areas between the elastic means and the head body, the second joining areas are arranged away from the first joining area in a direction substantially parallel to the recording surface, and the first joining area is arranged between the second joining areas, so that a displacement of the first joining area in a direction substantially parallel to the recording surface by an elastic deformation of the elastic means is substantially prevented. The first joining area and the second joining areas may be aligned substantially straightly in the direction substantially parallel to the recording surface.

DETAILED DESCRIPTION OF PREFERRED EMBODIMENTS

Figure 2:
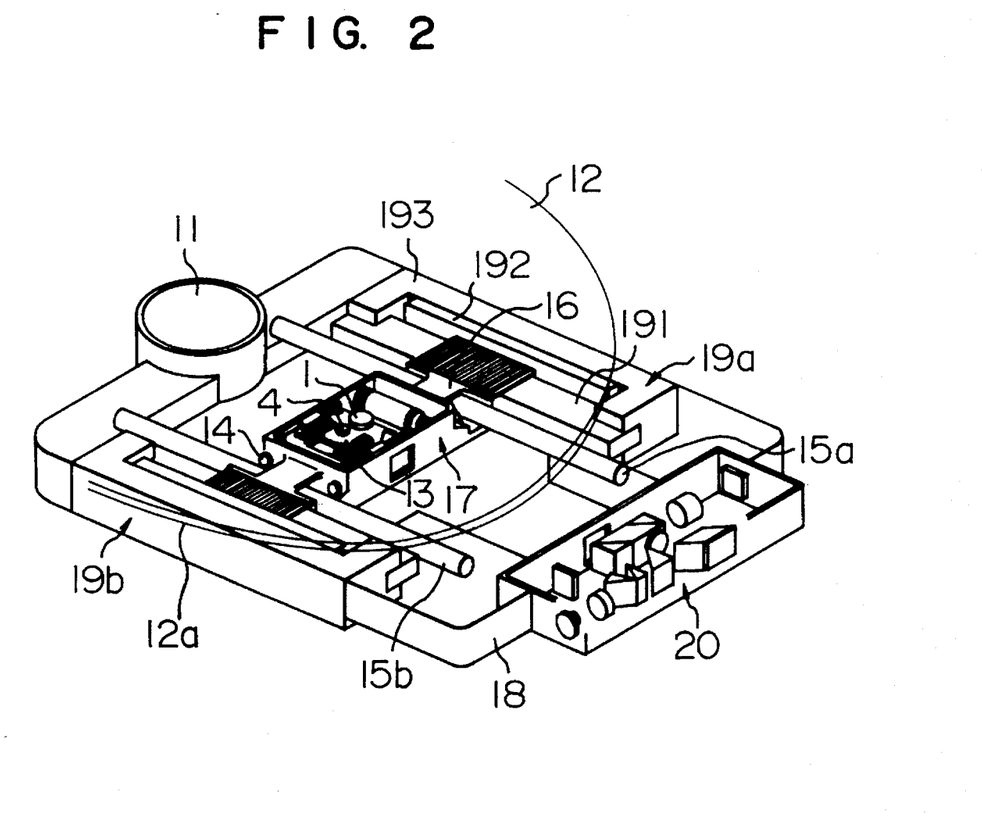
FIG. 2 is an oblique projection showing the optical head according to the present invention.

As shown in FIG. 2, a case 17 with an optical head 13 and a pair of rough-feed moving coils 16 is guided along guide rails 15a and 15b substantially parallel to a recording surface 12a of an optical memory disk 12 on a base frame 18 by rotational bearings 14 in a radial direction of the optical memory disk 12 rotated by a spindle motor 11. The case 17 is driven by energizing the rough-feed moving coils 16 in magnetic flux circuits 19a and 19b formed by center magnetic yoke cores 191, side magnetic yoke cores 193 and permanent magnets 192 on the base frame 18. A stationary optical device 20 reflects a light beam to supply it to the optical head 13 through a reflector 27 so that a separated-type optical head device is formed.

Figure 1:
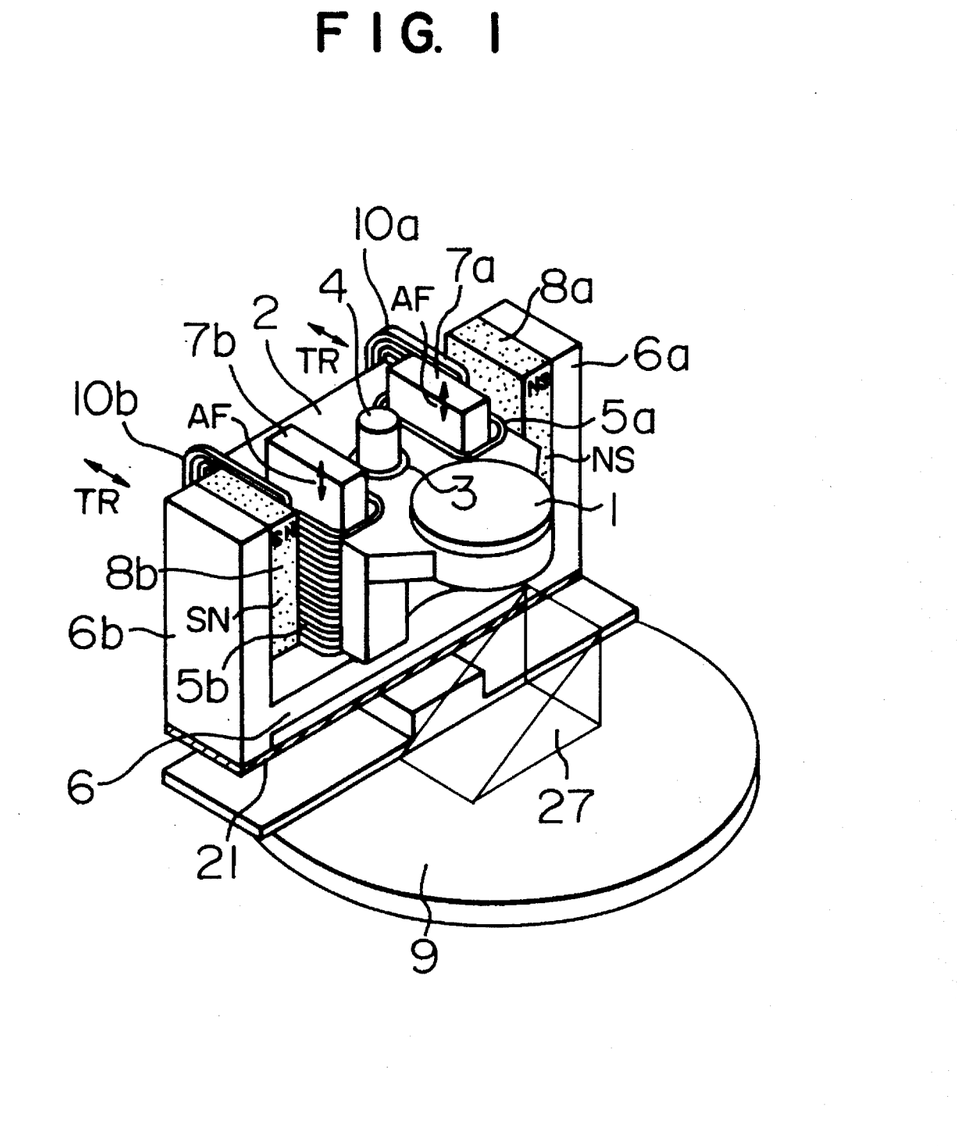
FIG. 1 is an oblique projection showing an important part of an optical head according to the present invention.

As shown in FIG. 1, the optical head 13 includes a carriage 2 with an object lens 1, a slide sleeve 3, precise-feed moving coils 10a and 10b and focussing moving coils 5a and 5b. An center axis of the slide sleeve 3 passes through the center of gravity of the carriage 2. An elastic member 21 is fixed to an adjuster member 9 to support a drive base member 6 elastically in both directions substantially perpendicular and parallel to the recording surface 12a against magnetic forces generated by the precise-feed moving coils 10a and 10b and focussing moving coils 5a and 5b, so that a vibration of the carriage 2 is prevented or absorbed by the elastic member 21. The drive base member 6 is elastically deformed by the force in the direction substantially parallel to the recording surface. The adjuster member 9 has a pin 4 fitted in the slide sleeve 3 in a rotatable and slidable manner so that the carriage 2 is guided substantially along the recording surface 12a in the radial direction of the optical memory disk 12. The adjuster member 9 is swingable on the case 17 to adjust an orientation of the object lens 1 relative to the recording surface 12a and is fixed to the case 17 after the adjusting. The adjuster member 9 with the pin 4 and the case 17 constitute the claimed head body.

The precise-feed moving coils 10a and 10b electrically energized generates a tracking magnetic force or moment force TR in a magnetic field between permanent magnets 8a and 8b mounted on magnetic outer yoke cores 6a and 6b of the drive base member 6 and magnetic inner yoke cores 7a and 7b of the drive base member 6 to rotate the carriage 2 so that the object lens 1 is positioned precisely substantially along the recording surface in the radial direction of the optical memory disk 12. A direction of the tracking magnetic force TR may be substantially parallel or oblique to the radial direction of the optical memory disk 12. The focussing moving coils 5a and 5b electrically energized generates a focussing magnetic force AF in the magnetic field so that the object lens 1 is positioned perpendicularly to the recording surface 12a. The carriage 2 is also supported elastically substantially perpendicular and parallel to the recording surface 2a by four spring (not shown) extending between extensions of the magnetic outer yoke cores 6a and 6b and the carriage 2.

Figure 3:
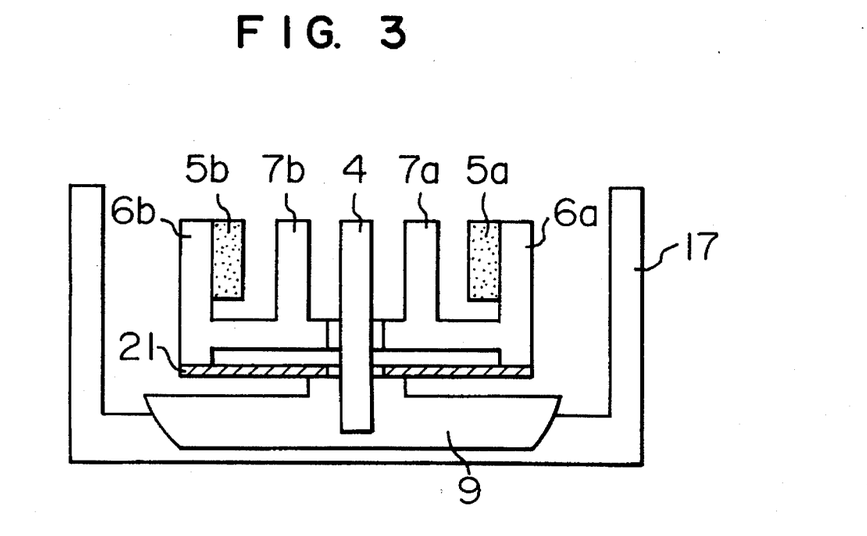
FIG. 3 is a cross-sectional view showing a connection among a head body, an elastic member and a drive base member according to the present invention.

As shown in FIG. 3, the magnetic outer yoke cores 6a and 6b and the magnetic inner yoke cores 7a and 7b are formed integrally to constitute the drive base member 6, the drive base member 6 has an aperture receiving the pin 4, longitudinal ends of the drive base member 6 are adhered to longitudinal ends of the elastic member 21, and a central portion of the adjuster member 9 is adhered to a central portion of the elastic member 21 with a hole 23 around the pin 4.

Figure 4:
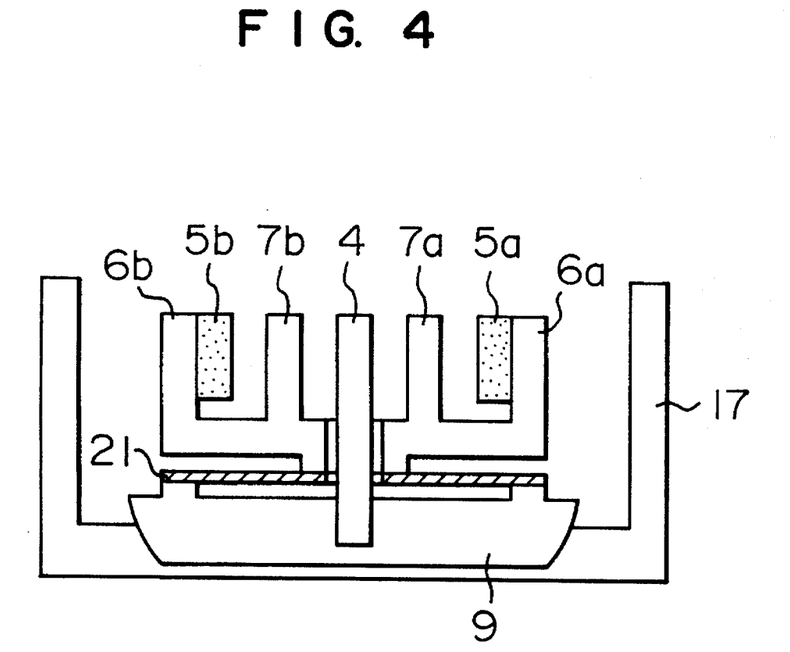
FIG. 4 is a cross-sectional view showing another connection among the head body, the elastic member and the drive base member, according to the present invention.

As shown in FIG. 4, a central portion of the integrally formed drive base member 6 with another aperture receiving the pin 4 may be adhered to the central portion of the elastic member 21, and the longitudinal ends of the elastic member 21 may be adhered to the longitudinal ends of the adjuster member 9.

Figure 5:
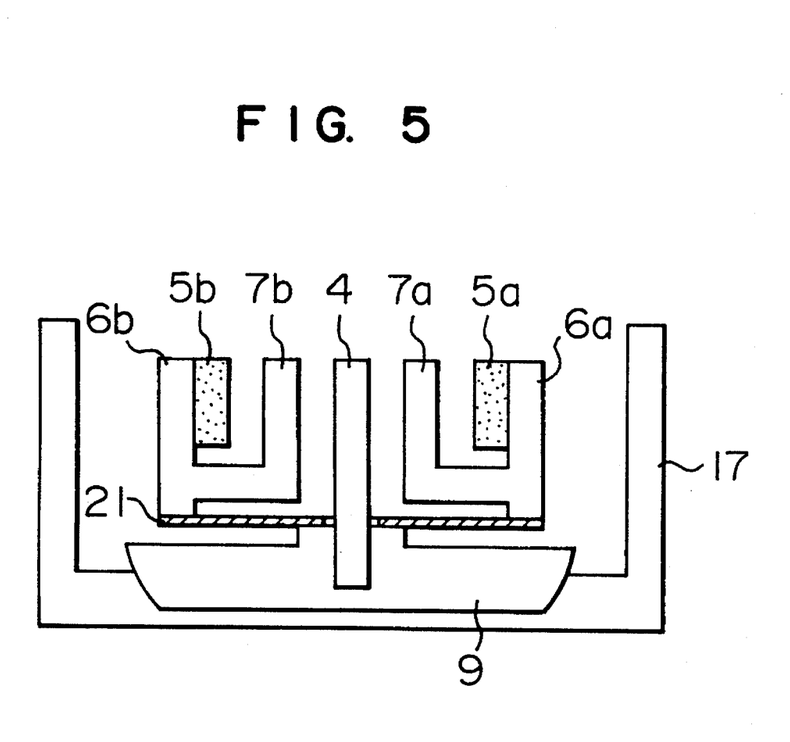
FIG. 5 is a cross-sectional view showing another connection among the head body, the elastic member and a divided drive base, according to the present invention.
Figure 6:
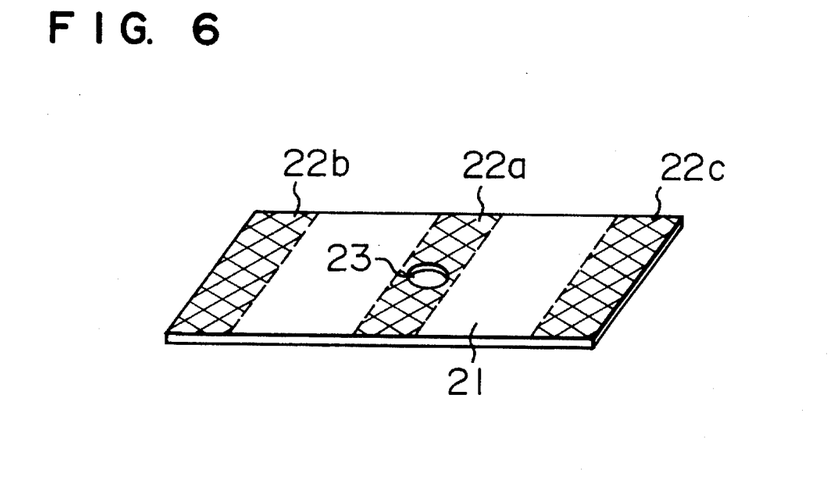
FIG. 6 is an oblique projection showing an elastic member with joining areas, according to the present invention.
Figure 7:
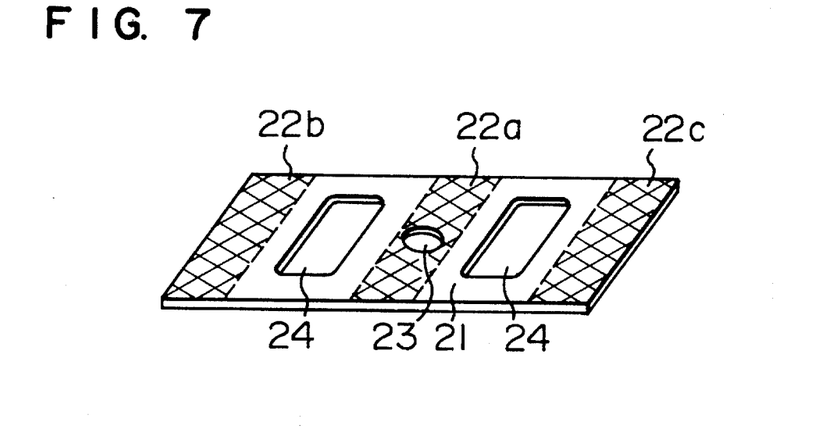
FIG. 7 is an oblique projection showing another elastic member with joining areas, according to the present invention.
Figure 8:
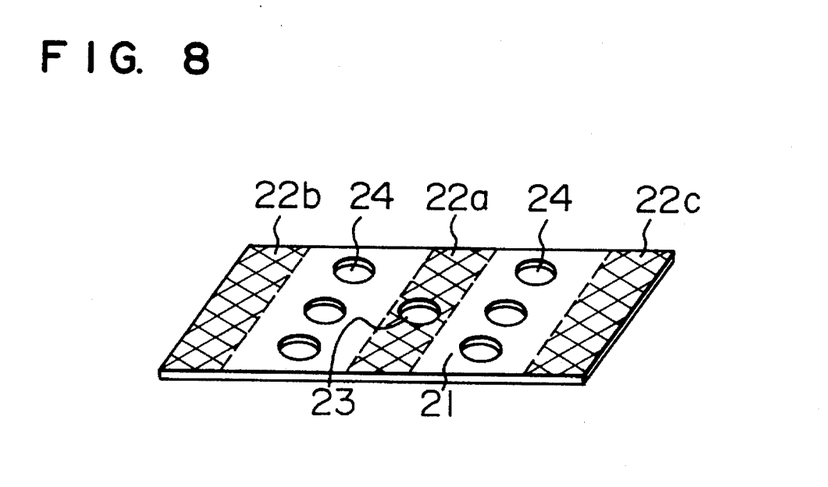
FIG. 8 is an oblique projection showing another elastic member with joining areas, according to the present invention.
Figure 9:
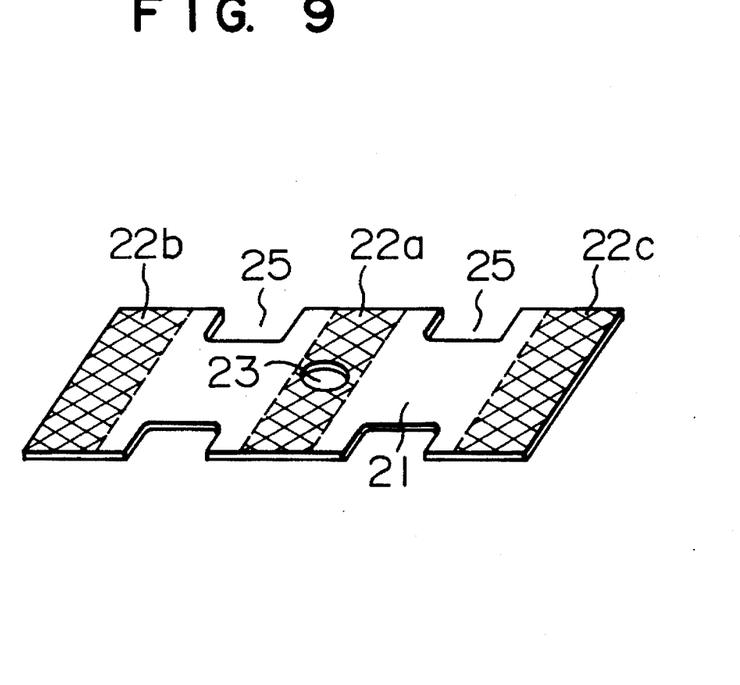
FIG. 9 is an oblique projection showing another elastic member with joining areas, according to the present invention.

As shown in FIG. 5, the magnetic outer yoke cores 6a and 6b and the magnetic inner yoke cores 7a and 7b may be formed separately to constitute the drive base member 6, each half of the drive base member 6 may be adhered to the longitudinal ends of the elastic member 21, and the central portion of the adjuster member 9 may be adhered to the central portion of the elastic member 21.

As shown in FIGS. 6–9, the elastic member 21 which is a plate-like member may have various shapes which extends in a direction substantially parallel to the force direction so that the plate-like member is twisted by the force. Joining areas 22a, 22b and 22c are formed by the above-described adherings between the elastic member 21 and the adjuster member 9 and between the elastic member 21 and the drive base member 6. A cross-sectional area of parts of the elastic member 21 between the joining areas 22a, 22b and 22c may be decreased by holes 24 and/or grooves 25 in comparison with a cross-sectional area at the the joining areas 22a, 22b and 22c so that a bending and/or twisting rigidity of the elastic member 21 in each of the directions substantially perpendicular and parallel to the recording surface 12a against the magnetic forces generated by the precise-feed moving coils 10a and 10b and the focussing moving coils 5a and 5b is decreased.

Figure 10:
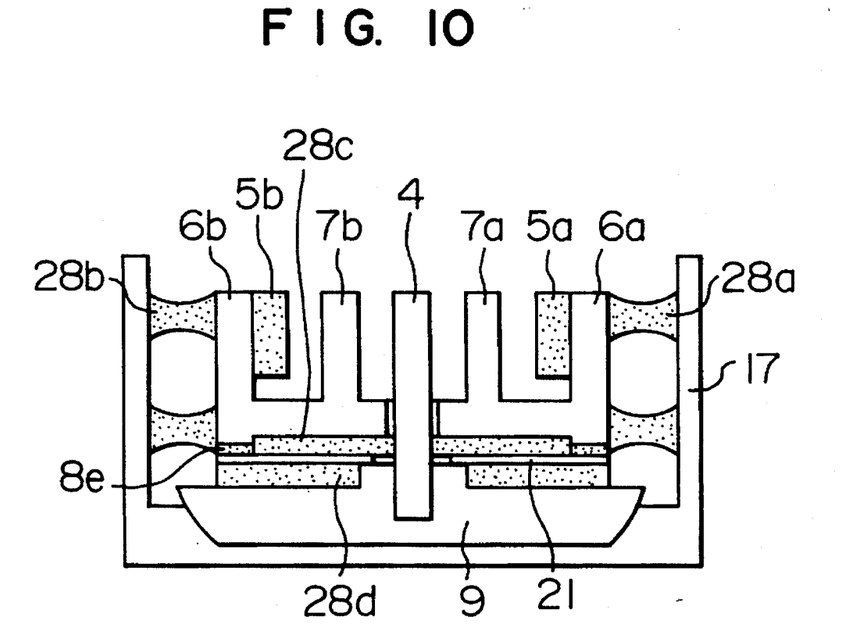
FIG. 10 is a cross-sectional view showing another connection among the head body, the elastic member, supplemental elastic members, viscoelastic members and the drive base member, according to the present invention.
Figure 11:
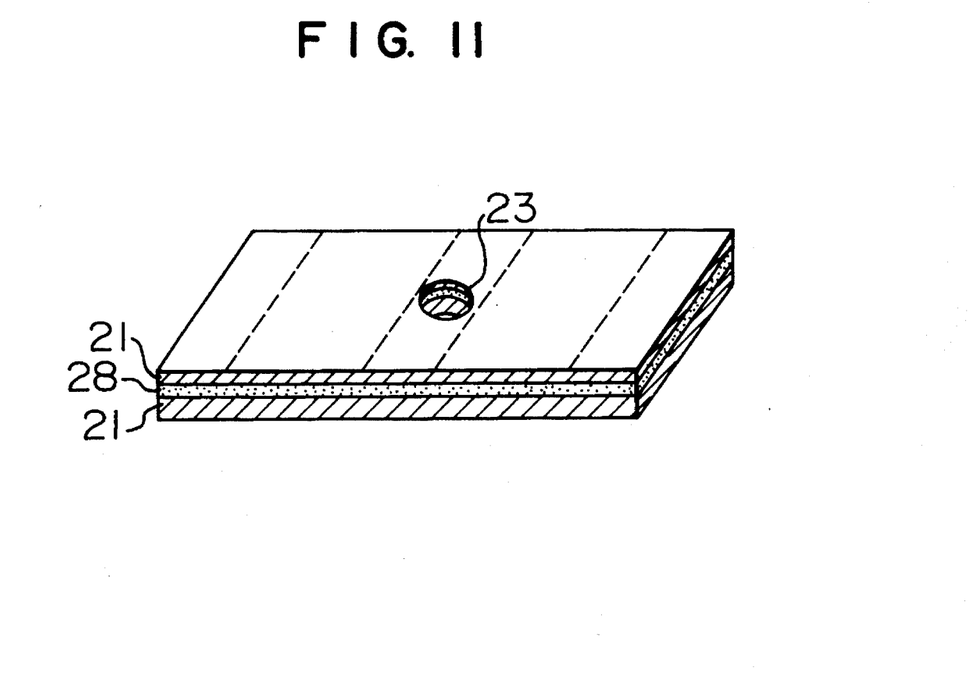
FIG. 11 is an oblique projection showing another elastic member with joining areas, according to the present invention.
Figure 12:
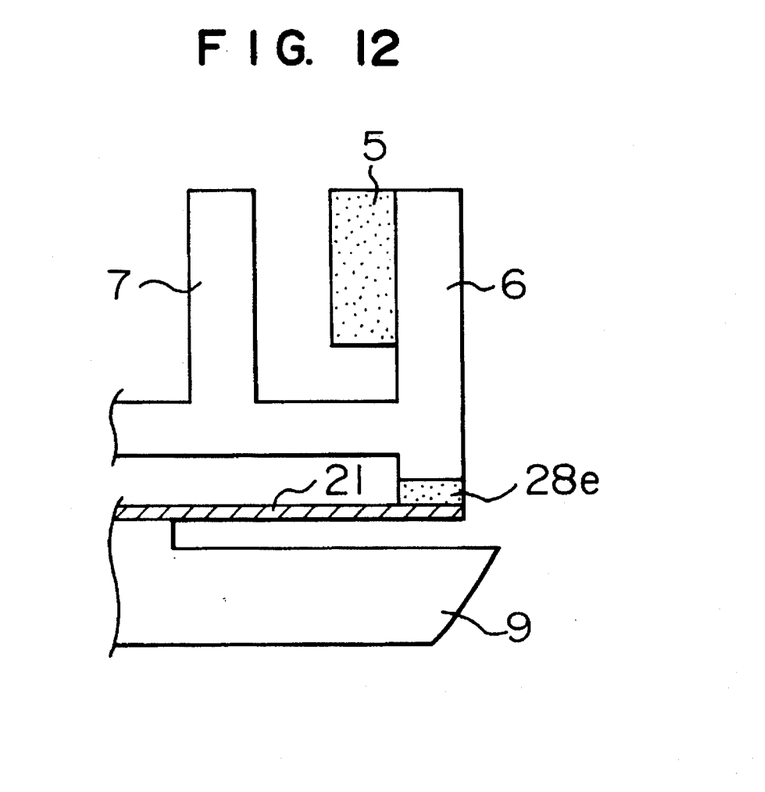
FIG. 12 is a partial view showing a connection between the elastic member and the drive base member, according to the present invention.
Figure 13:
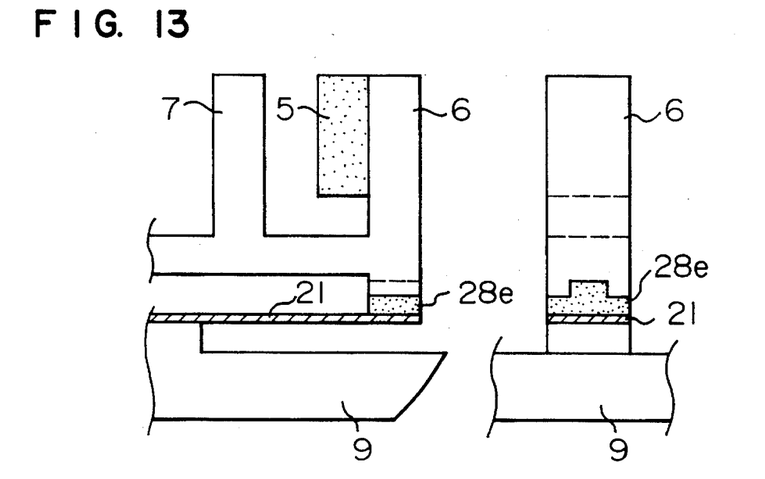
FIG. 13 includes partial views showing another connection between the elastic member and the drive base member, according to the present invention.

As shown in FIG. 10, elastic or viscoelastic members 28a and 28b may be arranged between the drive base member 6 and the case 17 to restrain an unnecessary deformation of the drive base member 6 or to absorb a vibration of the drive base member 6 in a direction oblique to the recording surface. Viscoelastic members 28c, 28d and 28d may be arranged between the drive base member 6 and the elastic member 21, between the drive base member 6 and the adjuster member 9, and/or between the elastic member 21 and the adjuster member 9 to absorb the vibration of the drive base member 6. As shown in FIG. 11, a viscoelastic members 28 may be arranged between a plurality of the elastic members 21. As shown in FIGS. 12 and 13, the elastic member 21 may be adhered to the drive base member 6 by a viscoelastic member 28e. The viscoelastic members 28a–28e are preferably made of silicon rubber.

Figure 14:
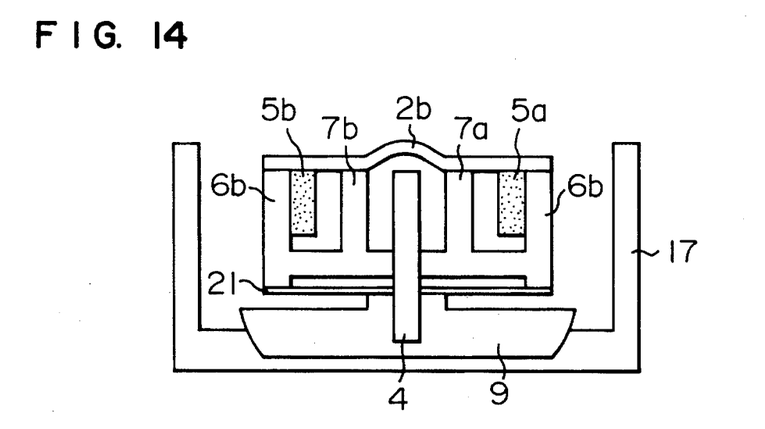
FIG. 14 is a cross-sectional view showing a reinforcing member for the drive base member, according to the present invention.
Figure 15:
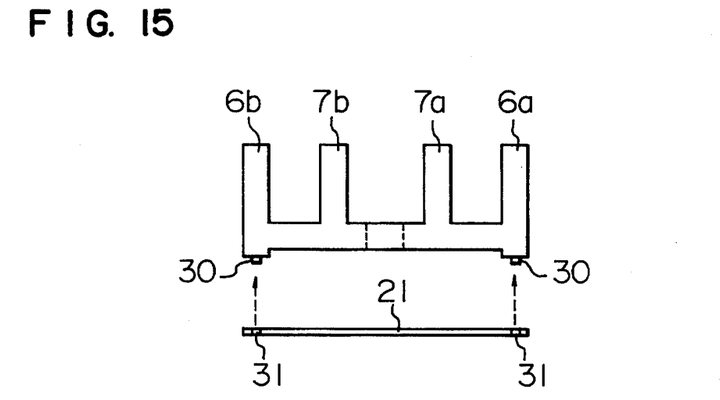
FIG. 15 is a cross-sectional view showing another connection between the elastic member and the drive base member, according to the present invention.

As shown in FIG. 14, the magnetic outer yoke cores 6a and 6b and the magnetic inner yoke cores 7a and 7b may be connected to each other by a connector 16 to reinforce the drive base member 6. The connector 16 is preferably made of a magnetically permeable material. As shown in FIG. 15, the drive base member 6 and the elastic member 21 may be connected to each other by pins 30 and holes 31 with a viscoelastic adhesive.

What is claimed is:

1. An optical head for a recording device in which data are recorded on a recording surface of an optical memory disk, comprising, a head body which is substantially prevented from moving perpendicularly to the recording surface and is movable to be positioned roughly along the recording surface, an object lens for focussing a light beam on the recording surface, a carriage on which the object lens is mounted and which is movable to be positioned precisely along the recording surface, a drive base member for generating a force substantially parallel to the recording surface between the drive base member and the carriage to position precisely the carriage along the recording surface, and elastic means for connecting the drive base member to the head body to support the drive base member relative to the head body elastically in a direction substantially parallel to the recording surface.

2. An optical head according to claim 1, wherein the drive base member is vibrated.

3. An optical head according to claim 1, wherein the elastic means is elastically twisted by the force to support elastically the drive base member relative to the head body in the direction.

4. An optical head according to claim 1, wherein the elastic means is elastically bent by the force to support elastically the drive base member relative to the head body in the direction.

5. An optical head according to claim 1, wherein the elastic means is elastically deformed in accordance with an elastic deformation of the drive base member caused by the force so that the drive base member is supported elastically relative to the head body.

6. An optical head according to claim 1, wherein the head body further comprises a rotationally supporting means for supporting the carriage in a rotatable manner on the head body so that the carriage is rotated on the head body by the force to be moved along the recording surface.

7. An optical head according to claim 1, wherein, in a direction substantially perpendicular to the recording surface, a level in which at least a part of the elastic means extends is different from a level in which the force is generated, so that a moment of a force around an imaginary axis substantially parallel to the recording surface is applied by the force to the elastic means to support elastically the drive base member in the direction.

8. An optical head according to claim 1, further comprising a supplemental supporting means for connecting the drive base member to the head body to support the drive base member relative to the head body elastically in a direction oblique to the recording surface.

9. An optical head according to claim 1, further comprising a viscoelastic member for connecting the drive base member to the head body.

10. An optical head according to claim 1, further comprising a viscoelastic member for connecting the drive base member to the elastic means.

11. An optical head according to claim 1, further comprising a viscoelastic member attached to the elastic means.

12. An optical head according to claim 1, further comprising a viscoelastic member for connecting the head body to the elastic means.

13. An optical head according to claim 1, wherein the drive base member includes at least two projections, a dent for receiving the carriage between the projections, and a connector member connecting the projections to each other.

14. An optical head according to claim 1, wherein a cross-sectional area of the elastic means varies along a longitudinal direction of the elastic means.

15. An optical head according to claim 1, wherein the elastic means is a plate-like member extending in a direction substantially parallel to the force direction so that the plate-like member is twisted by the force.

* * * * *